Nov. 8, 1932.   F. A. PARSONS   1,886,833
MACHINE TOOL STRUCTURE
Filed Nov. 8, 1928   2 Sheets-Sheet 1

INVENTOR
Fred G Parsons

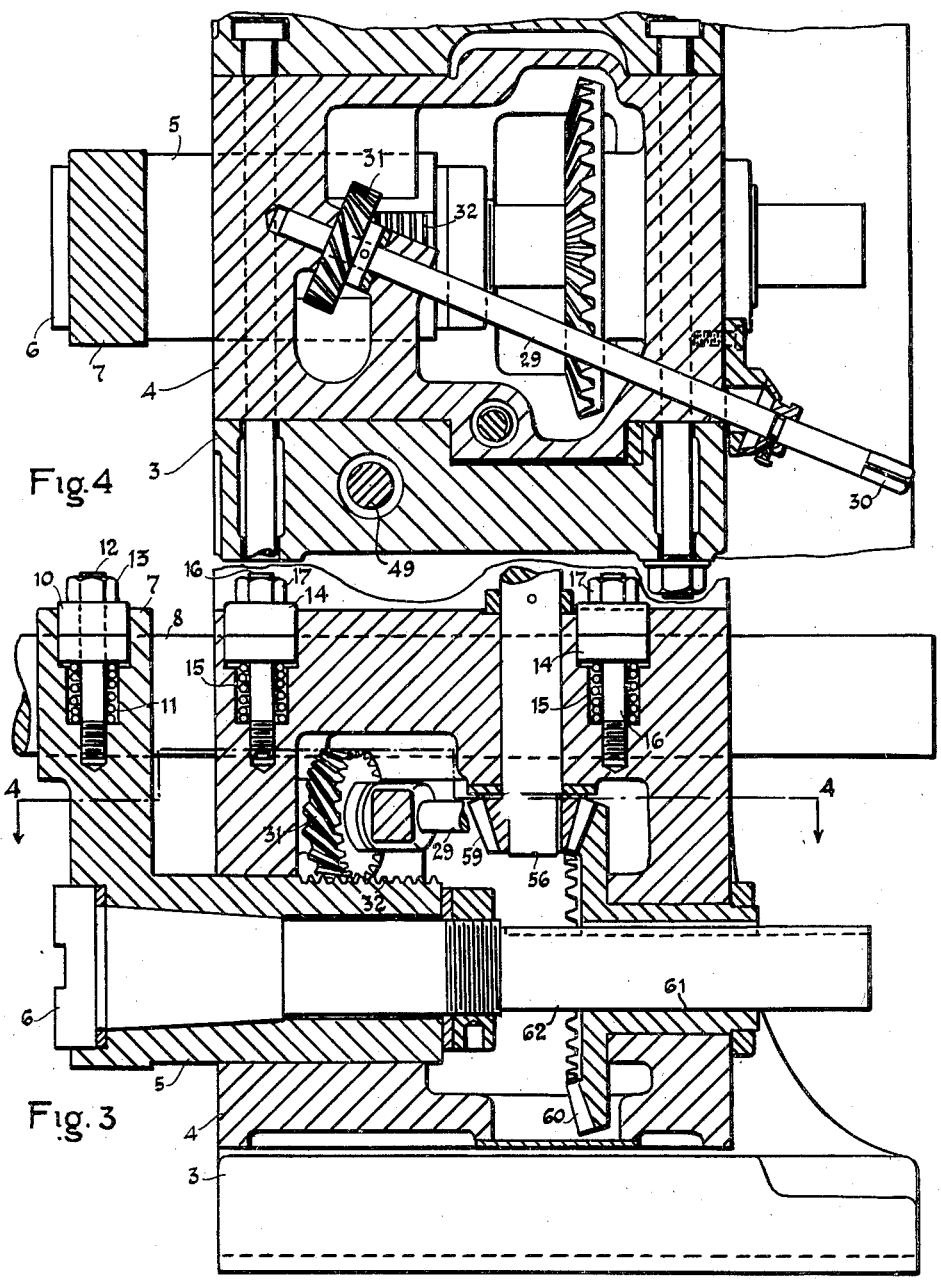

Patented Nov. 8, 1932

1,886,833

UNITED STATES PATENT OFFICE

FRED A. PARSONS, OF MILWAUKEE, WISCONSIN, ASSIGNOR TO KEARNEY & TRECKER CORPORATION, OF WEST ALLIS, WISCONSIN

MACHINE TOOL STRUCTURE

Application filed November 8, 1928. Serial No. 317,924.

This invention relates to machine tools and particularly to milling machines.

It is an object of the invention to provide an improved structural arrangement for the support of a cutter or tool relative to a work support, while permitting their relative adjustment, and with improved convenience of adjustment and clamping.

A further object is generally to improve the construction and operation of machine tools, more particularly of milling machines, and still other objects will be apparent from this specification.

The invention consists in the particular arrangement herein illustrated, described and claimed and includes such modifications of the structure illustrated as may be equivalent to the claims.

In the accompanying drawings, the same reference characters have been used for the same parts throughout.

Fig. 3 is a partial, vertical section of a portion of a frame and a spindle carrier shown in Figs. 1 and 2. The section is taken along line 3—3 of Fig. 2 and is enlarged.

Fig. 4 shows a horizontal section along line 4—4 of Fig. 3.

Figures 1, 2, 5, 6:
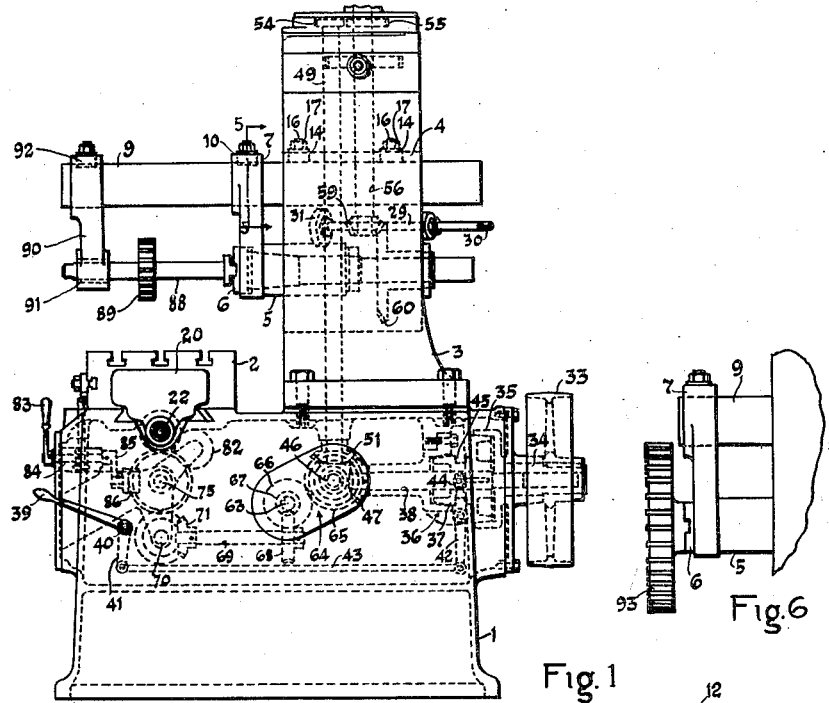
Fig. 1 is a right side elevation of a milling machine embodying the invention.
Fig. 2 shows a front elevation of the same machine.
Fig. 5 is a partial section along line 5—5 of Fig. 1 and enlarged.
Fig. 6 shows an alternative use of certain mechanism shown in Fig. 1.

The milling machine provides a base or support 1 upon which is guided a table 2 for movement to right or left in Fig. 2. Fixed on bed 1, adjacent the side of table 2 is a support member or head 3, having portions 3a and 3b spaced apart in the direction of the travel of table 2 and between which a spindle carrier or support 4 is closely fitted for vertical adjustment. A sleeve or support 5 is slidably guided in carrier 4 for adjustment relative thereto to right or left in Fig. 1 and journaled in sleeve 5 is a tool spindle 6 restrained for adjustment with the sleeve for the end of the spindle to project over the table 2. Supported in carrier 4 are the overarms 8—9 positioned above the spindle carrier and spaced apart in the direction of table travel and each adjustable in mutually parallel paths each parallel with the path of adjustment of sleeve 5. Fixed with the sleeve 5 is a portion or member 7 provided with surfaces closely but slidably fitted on the arms 8—9. The member 7 may be clamped with the overarms 8—9 and the overarms may be clamped with the spindle carrier 4 by the means of clamps which are similar and of which therefore only one will be described in detail. The overarms being in this instance round bars, the surfaces of member 7 and carrier 4 which fit therewith to form the slides for adjustment are in this case bores.

For clamping member 7 with the overarms there is provided a clamp member 10, Figs. 1—3—5, normally pressed upwardly by means of spring 11 to free the overarms but which may be forced downwardly by means of stud 12 and nut 13 to simultaneously bind both overarms in their respective bores. In Fig. 3 is shown similar clamp members 14 having springs 15, studs 16 and nuts 17 for similarly binding or releasing the arms in the bores of carrier 4.

The various movable elements are provided with manual adjusting means as follows: For the table 2, there is provided screw 18 journaled in brackets 19—20 fixed on the end of the table in a manner permitting rotation of the screw but forcing the table to move with the axial movement of the screw. Screw 18 engages nut 21 fixed with base 1 and may be manually rotated to move the table by means of an end portion 22 squared to receive a crank, not shown.

The carrier 4 may be manually adjusted vertically by means of screw 23 journaled in the head 3 but prevented from axial movement and engaging a nut portion 24, Fig. 2, fixed with the carrier. Screw 23 may be rotated to move the carrier by the means of a shaft 25 connected with the screw by the meshed bevel gears 26—27, the shaft 25 having a squared end portion 28 adapted to receive a crank, not shown.

The spindle sleeve may be manually adjusted by means of a shaft 29, Figs. 1—3—4, having a squared end portion 30 adapted to receive a crank, not shown, there being a helical gear 31 fixed on the shaft and engaging with suitable rack teeth 32 on sleeve 5.

If the clamp member 10 is tightened and clamp members 14 are loosened, the overarms are restrained to move with sleeve 5 and therefore may be manually adjusted by the means described. They may be also independently manually adjusted if the several clamps are all released, there being no adjusting mechanism for this purpose since the individual arms are of relatively light weight, and may be pushed in and out in their slides without need of such mechanism.

Transmission mechanism is provided for driving spindle 6 in any position of adjustment of sleeve 5 as follows: A power source is provided consisting of a pulley 33 fixed on a sleeve 34 upon which is also fixed member 35 of a friction clutch generally denoted by the numeral 36 and having a member 37 slidably keyed on a shaft 38, the members 37 and 35 having complementary friction faces adapted to drive the one member from the other when the faces are engaged. Member 37 may be shifted to engage or disengage the clutch members by the means of a hand lever 39, fixed on a shaft 40 upon which is also fixed a lever 41 connected for movement of a pivoted lever 42 by means of a rod 43, the lever 42 having a fork portion 44 engaging an annular groove 45 in the extended hub of clutch member 37. Shaft 38 drives a shaft 46 by means of meshed bevel gears 47—48, Fig. 2, and shaft 46 drives a shaft 49 by means of meshed bevel gears 50—51. Shaft 49 drives a shaft 52 through a rate changer generally denoted by the numeral 53 and consisting of different diametered gears 54—55 interchangeable between the ends of the respective two shafts, whereby shaft 52 will be driven at different speeds according to the different positions of the gears. Shaft 52 drives a vertical shaft 56 through the gears 57—58, the shaft 56 being rotatably journaled in carrier 4 and restrained for bodily vertical movement therewith and slidably keyed in the gear 58. Fixed on the lower end of shaft 56 is bevel gear 59 meshing with bevel gear 60, Fig. 3, journaled in carrier 4 in axial alignment with spindle 6 and having bore 61 within which an extended shank portion 62 of spindle 6 is slidably keyed. By the mechanism described, spindle 6 may be driven from pulley 33 or the transmission may be interrupted by means of clutch 36.

Transmission mechanism is also provided for the movement of table 2 as follows: The shaft 46 drives a shaft 63, Figs. 1-2, through a rate changer generally denoted by the numeral 64 and consisting of different diametered gears 65—66 interchangeably mounted on the ends of the respective shafts whereby shaft 63 may be driven at either of two speeds according to the different positions of the gears. Fixed on shaft 63 is a worm 67 engaging a worm wheel 68 fixed on a shaft 69 which drives a shaft 70 through bevel gears 71—72. Shaft 70 drives a reverser clutch member 74 by the means of a gear 73 meshing with a gear 87 fixed on the member 74. Member 74 is supported for movement in one or the other direction along a shaft 75 to engage with clutch members 76 or 77 according to the direction of its movement, the several clutch members having complementary clutch teeth whereby either member 76 or 77 may be driven from the clutch member 74, there being a central position of the clutch member 74 in which neither of the other clutch members are driven therefrom. The clutch members 76 and 77 are connected to rotate screw 18 in opposite directions respectively, the clutch member 76 driving the screw through gear 78 fixed on the clutch member and meshing directly with a gear 79 slidably splined on the screw 18 and the clutch member driving the screw through a gear 80 fixed therein and driving a gear 81 through an idler gear 82, Fig. 1, the gear 81 being slidably splined on lead screw 18, the arrangement constituting a reverser for moving table 2 in either direction of its travel in accordance with the position of clutch member 74.

Clutch member 74 may be shifted by means of hand lever 83 fixed on shaft 84 upon which is also fixed a lever 85 carrying a pivoted fork member 86 engaging opposite sides of gear 87. The transmission trains described are typical of a variety of trains which may be used to actuate the spindle 6 and table 2.

The arrangement whereby the projecting end of the spindle sleeve 5 is provided with supplemental support in any position of its adjustment and whereby such support is adjustable relative to the sleeve, is of particular value in a machine of this type in that it provides especially rigid support for any of various operating conditions requiring various types of tools driven from the spindle 6. In Fig. 1, for instance, the spindle is shown driving an arbor 88 and a cutter 89, the projecting arbor end being supported and aligned with the spindle by means of a pendant 90 having arbor bearing 91 and which in turn is supported from the overarms 8—9, being provided with suitable bores closely fitting thereon to permit adjustment of the pendant, and a clamp generally denoted by the numeral 92 for fixing the position of the pendant on the overarms, clamp 92 being exactly similar to the previously described clamp associated with the member 7. In Fig. 6, there is shown a different set-up in which a face milling cutter 93 is supported directly on the end of spindle 6. In such case, the overarms 8—9 are preferably adjusted rearwardly to the position shown relative to the sleeve 5, whereby relatively large work pieces may pass without interference. In either case the construction provides an auxiliary support for the outer end of the movable spindle sleeve which is of particular convenience in that the support, the sleeve and the cutter may be adjusted together as a unit in the direction of the spindle axis, and also vertically as a unit together with the spindle carrier 4.

What is claimed is:

1. In a machine tool, the combination of a base, a table reciprocably supported therefrom, a head uprising from said base adjacent a longitudinal edge of said table, a carrier supported from said head for vertical movement relative thereto, a spindle carrying sleeve supported from said carrier for bodily vertical movement therewith and for adjustment relative thereto in a direction transverse to the movement of said table for an end thereof to project in the direction of said table, an overarm supported from said carrier above said spindle and adjustable relative to said carrier in a path parallel with the adjustment of said spindle carrying sleeve, and a member connecting said overarm and sleeve adjacent said projecting end of said sleeve, whereby the projecting end of said sleeve is provided with a supplementary support movable as a unit therewith in a plurality of mutually transverse paths.

2. In a machine tool the combination of a base, a table reciprocably supported therefrom, a head uprising from said base adjacent a longitudinal edge of said table and providing different portions spaced apart in the direction of table travel, a carrier slidably fitted between said portions to be guided for vertical movement, a spindle carrying sleeve supported from said carrier for adjustment in a direction transverse to table movement for an end thereof to project in the direction of said table, an overarm supported from said carrier above said sleeve for adjustment in a direction parallel with the direction of said sleeve adjustment, and a member connecting said projecting end of said sleeve with said overarm.

3. In a machine tool the combination of a bed, a table reciprocably supported therefrom, a head uprising from said bed adjacent a longitudinal edge of said table, a carrier supported from said head for vertical adjustment, a spindle carrying sleeve supported from said carrier for adjustment in a direction transverse to the direction of table movement and for an end thereof to project in the direction of said table, a support for said projecting end of said sleeve and independently supported from said carrier for adjustment in a direction parallel with the direction of adjustment of said sleeve, means connecting support and sleeve for simultaneous adjustment whereby to form an adjustable unit, and means for adjustment of said unit.

4. In a machine tool, the combination of a base, a table reciprocably supported therefrom, a member uprising from said base above said table and adjacent a longitudinal table edge, a spindle element supported from said member for adjustment relative thereto for an end thereof to project in the direction of said table, an overarm element supported from said member above said spindle for independent adjustment in a direction parallel with the direction of spindle adjustment, a device for adjusting one of said elements as stated, and a structure connecting the other of said elements with said device for simultaneous adjustment relative to said member.

5. In a milling machine the combination of a reciprocable work table, a support uprising adjacent a longitudinal edge of said table, a sleeve supported from said support for adjustment relative thereto for an end thereof to project beyond said support in the direction of said table, a spindle journaled in said sleeve, an overarm device supported from said support to project therefrom in the direction of said table, and means directly supporting the projecting end of said sleeve from the projecting portion of said overarm device, said means being alternatively clampable to fix the position of adjustment of said sleeve relative to said device and releasable to permit of said relative adjustment.

6. A milling machine as specified in claim 5 in which said overarm device is adjustable in the direction of said sleeve adjustment, and means for the simultaneous adjustment of said sleeve and overarm device.

7. In a milling machine, the combination of a base, a table reciprocably supported thereon, a head uprising from said base adjacent an edge of said table, a spindle carrying sleeve supported from said head for adjustment relative thereto in a path transverse to table movement, a plurality of overarms each supported from said head for independent adjustment in paths mutually parallel and parallel with the adjustment of said sleeve, and means connecting said sleeve with each of said overarms for simultaneous adjustment of said overarms and sleeve as a unitary device.

8. A milling machine as specified in claim 7 in which said connecting means consists of a member adapted to provide mutual support between portions of said overarms and sleeve projecting from said head.

9. In a machine tool the combination of a base, a table reciprocably supported therefrom, a head supported from said base and uprising adjacent an edge of said table, a spindle carrying sleeve adjustable relative to said head in a direction transverse to the direction of table movement for an end thereof to project in the direction of said table, and a support for the projecting end of said sleeve, said support being independently supported from said head and movable with said sleeve during said adjustment thereof.

10. In a milling machine the combination of a base, a work table movably supported therefrom, a head supported from said base and uprising adjacent an edge of said table, a tool spindle rotatably supported from said head for bodily movement in a direction transverse to the movement of said work table, an overarm supported from said head above said spindle for bodily movement in a path parallel to said spindle movement, a structure interconnecting said spindle and overarm for the described movements thereof to be effected simultaneously, a shaft and a motion transmitting connection from said shaft to said structure for movement thereof.

11. In a milling machine, the combination of a base, a work table movably supported therefrom, a head supported from said base and uprising adjacent an edge of said table, a horizontal tool spindle rotatably supported from said head and axially transverse to the direction of movement of said table and bodily movable relative to said head in an axial direction, an overarm device supported from said head above said spindle and bodily movable relative to said head in a path parallel to the bodily movement of said spindle, a spindle journaling structure supported from said head and movable to effect said bodily spindle movement and adapted for interconnecting said overarm device and spindle for simultaneously effecting said bodily movement thereof, a tool arbor projecting from said spindle to extend over said table, a bearing for said arbor and supported from said overarm device in axial alignment with said spindle, said overarm device being also movable in said path of movement thereof independently of said structure and spindle and adapted to maintain said axial alignment of said bearing in various positions of said independent movement, a shaft, and a motion transmitting connection from said shaft to said structure for said movement thereof.

In witness whereof I have hereto affixed my signature.

FRED A. PARSONS.